United States Patent [19]
Lalloz et al.

[11] Patent Number: 4,641,270
[45] Date of Patent: Feb. 3, 1987

[54] PROCESS FOR MANUFACTURING A MOLD USING THREE-DIMENSIONAL COMPUTER MODELLING

[75] Inventors: Paul Lalloz, Montigny les Cormeilles; Hung A. Vo, Orly, both of France

[73] Assignee: La Telemecanique Electrique, France

[21] Appl. No.: 726,578

[22] Filed: Apr. 24, 1985

[30] Foreign Application Priority Data

Apr. 25, 1984 [FR] France ................ 84 06471

[51] Int. Cl.$^4$ .............. G06F 15/46; G05B 19/00; B22D 17/22
[52] U.S. Cl. .................. 364/476; 364/194; 364/468; 364/300; 425/175
[58] Field of Search .......... 364/191, 194, 468, 476, 364/518, 521, 522, 300; 318/162, 568, 578; 425/117, 125, 149, 175–177, 522, 542; 164/159, 161–162, 164, 167

[56] References Cited
U.S. PATENT DOCUMENTS

| | | |
|---|---|---|
| 3,723,585 | 3/1973 | Nussbaum ............... 425/175 X |
| 3,867,078 | 2/1975 | Porter ..................... 425/175 X |
| 4,181,954 | 1/1980 | Rosenthal et al. ........ 364/191 X |
| 4,368,020 | 1/1983 | Brown et al. ............. 425/175 X |
| 4,393,450 | 7/1983 | Jerard ..................... 364/191 X |
| 4,409,718 | 10/1983 | Pryor ..................... 364/476 X |
| 4,430,718 | 2/1984 | Hendren .................. 364/191 X |
| 4,452,590 | 6/1984 | Trell ....................... 425/175 X |
| 4,558,420 | 12/1985 | Gerber .................... 364/476 |

*Primary Examiner*—Gary V. Harkcom
*Attorney, Agent, or Firm*—William A. Drucker

[57] ABSTRACT

The process comprises the modelling of the piece and its negative in three dimensions, determination of a main joint plane of the two mold parts, searching for the unstrippable zones by simulating a relative translational movement between the model of the piece and the two parts of the model of its negative defined by the reference plane and by determining the contact zones between the piece and the negative, a determination of the offset joint plane in successive sections of the model of the negative including the zones, modelling of the mobile and fixed impressions as a function of the previously determined joint planes, and manufacture of the mold whose fixed and mobile parts comprise joint planes and impressions in accordance with those previously determined.

4 Claims, 11 Drawing Figures

PROCESS FOR MANUFACTURING A MOLD USING THREE-DIMENSIONAL COMPUTER MODELLING

BACKGROUND OF THE INVENTION

The present invention relates to a process for manufacturing a mold from the shapes of a piece which it is desired to obtain by molding.

It relates more particularly to the manufacture of a mold formed from at least two parts movable in translation with respect to each other along a given axis, and each having a part of the impression of the piece to be molded.

Thus, in the closed position of the mold, these two parts are assembled jointingly together and define by their impressions, a closed volume having substantially the dimensions of the piece and in which the molding material may be injected. Once the material has set, the molded piece is removed from the mold by separating the two parts of the mold by a movement during which the piece which has just been molded is extracted from at least one of the mold parts, the piece then being freed from the other part for example by means of an ejector.

It is clear that in the case of a piece having a prismatic shape, removal from the mold may take place without difficulty. On the other hand, in the case of pieces having more complex shapes, it is necessary to design molds in which the joint planes of the two mold parts are particularly designed so as to allow removal from the mold without having to use, as much as possible, drawers or other expedients which considerably increase the complexity of the mold and consequently its cost price.

Of course, to this problem of determining the joint planes are added numerous other problems which should be resolved such for example as the problem of shrinkage, the problems of draw tapers, of undercuts etc. . . .

In the present state of the technique, for determining the structure and shapes of the mold, the mold pattern designer uses at the outset drawings of the piece in two dimensions. He reproduces these drawings with new dimensions taking into account the shrinkage of the piece during molding.

After studying the shapes of the piece, he then makes an approximate search for the joint planes of the two parts of the mold.

This is a particularly delicate operation requiring all the experience and all the knowledge of the mold pattern designer for finding the best possible solution considering the specifications.

The designer must then define the piece in position in space with respect to the impressions, then represent the piece in perspective so as to obtain visualization thereof in three dimensions.

He must further represent the negative of the pieces in three dimensions (or simply make tracings of the solid and hollow parts of the piece). This representation must in particular comprise exploded views of the fixed and mobile parts of the mold and definition of all the shapes of the impressions.

In a subsequent phase, the mold pattern designer cuts out the impression portions then procedes with finishing the design and possibly optimization thereof.

It can therefore be seen that the whole of the work to be carried out for defining a mold by using this method is relatively long and costly. This method further requires the employment of particularly competent and experienced pattern mold designers capable of defining the best possible joint planes from two-dimensional drawings.

SUMMARY OF THE INVENTION

The purpose of the invention is to overcome all these disadvantages. It provides a process for considerably simplifying the task of the pattern mold designer by relieving him of tedious tasks and facilitating the search for the optimum solution, so as to thus obtain an appreciable saving of time and a considerable reduction in the cost price of the mold of which an appreciable part (about 30%) is earmarked for designing and constructing the mold.

To arrive at this result, the invention necessarily uses a processer having design software assisted by a computer allowing graphic two or three dimensional representations of the piece to be effected, on request, from a file comprising the whole of the shape characteristics of the piece.

It is known that at the present time, among computer assisted design software for the three dimensional modelling of an object, three main types of software may be distinguished, namely:

software for obtaining a "wire" model, only keeping the coordinates of the apices of the object modelled as well as the edges joining these apices;

software for obtaining a surface type model, by definition of the surfaces of the modelled object;

software for obtaining "solid" or voluminal models by integrating the matter concept.

The software suitable for use with the process of the invention must more precisely allow a combined representation of the three above mentioned modelling types to be obtained.

It must in particular allow matter to be distinguished from the absence of matter and a piece from its impression. It must allow the use, without restriction, of boolean operators (theory of sets) and applications thereof more especially for realizing functions such as the removal of material, cuts and sections or else the detection of common parts. It must also allow all the intermediate steps carried out during a modelling process to be stored, and a modification effected during an intermediate step to be transferred to the model obtained during a subsequent step. It must further allow automatic changes of planes, units and standards.

It should be noted that the processor used and the computer assisted design software are well known and form no part of the present invention. This latter consists in fact in the use of this software and adaptation thereof in the very particular case of a process for constructing a mold from a piece which is desired to obtain by molding.

Thus, more precisely, the process of the present invention comprises at least the following steps:

the modelling and graphic representation of the piece in three dimensions, determination, from the shapes of the piece and/or of its model, of a reference plane, called hereafter zero joint plane which forms the main plane of separation between the two parts of the mold, the modelling and possible graphic representation of the negative of the piece, in three dimensions, inside a cubic volume which may have the dimensions of the block of material from which the mold is to be constructed (mold block), insertion of the model of the piece in the model of its negative, search for the unstrippable zones by simulating a relative movement between the model of the piece and the two parts of the model of its negative defined by the reference plane, along an axis perpendicular to said plane, and by determining the contact surfaces between the piece and the impressions, visualization of the contact surfaces by a graphic representation in at least one given plane, the systematic graphic representation, in planes perpendicular to the reference plane, of the sections of the model of the negative passing through unstrippable zones and determination of the joint planes offset in successive slices of the model of the negative including said zones, and of a width corresponding to said zones, modelling the mobile and fixed impressions as a function of the previously determined joint planes, modelling of the piece volume from the fixed impression, modelling of the piece volume from the mobile impression, formation of tapers on said volumes from the joint planes, merging of the tapered piece volumes so as to transfer the complete design to a piece of actual dimensions, the manufacture of the mold from the fixed and mobile parts comprising joint planes and impressions in accordance with those previously determined.

BRIEF DESCRIPTION OF THE DRAWINGS

One embodiment of the invention will be described hereafter, by way of non limitative example with reference to the accompanying drawings in which:

FIGS. 1 to 10 are schematical representations illustrating different steps of the process of the invention, namely:

visualization of the model of the piece in three dimensions (FIG. 1), visualization of the model of the negative of the piece in three dimensions (FIG. 2), visualization of the model of a case obtained by cubage to the standard dimensions of the impression (FIG. 3), visualization, in two dimensions, of the unstrippable zones of the model of the piece with respect to the reference joint plane (FIGS. 4a and 4b), visualization, in two dimensions, of a section of the model of the impression in an unstrippable zone (FIG. 5), the designer deciding on the choice of these sections, visualization of the same type as that of FIG. 5, but in which the offset joint planes have been determined (FIG. 6), by the designer by locating existing points of the section (FIG. 5) on the one hand or by creating some from others on this same section on the other hand, visualization, in three dimensions, illustrating the construction of the model of a slice of the case to the width of the previously determined unstrippable zone (FIG. 7), three dimensional visualization of the fixed part of the model of the slice shown in FIG. 7 (FIG. 8), three dimensional visualization of the fixed part of the model of the case without impression with its offset joint planes (FIG. 9), three dimensional visualization of the model of the piece and of the two parts of the model of the case with their respective impressions (FIG. 10), modelling of the volume of the piece from the fixed impression, modelling of the volume of the piece from the mobile impression, and transformation of the faces of the impression and by backed off faces from the joint planes.

DESCRIPTION OF THE PREFERRED EMBODIMENT

As mentioned above, the first step of the process of the invention consists in the computer modelling of the piece which it is desired to obtain by molding. This modelling is effected in three dimensions in accordance with the procedure of the computer assisted design software used. This modelling of the piece consequently involves the formation of a file containing all the parameters of the piece which may be used by the software as well as the storing of data coming from the design specifications of the piece, which may more particularly concern the molding material, the quantity to be produced, information relative to the tolerances, to the appearance faces, injection traces, ejection traces on the relief and undercut portions, fins and molding constraints.

Figure 1:
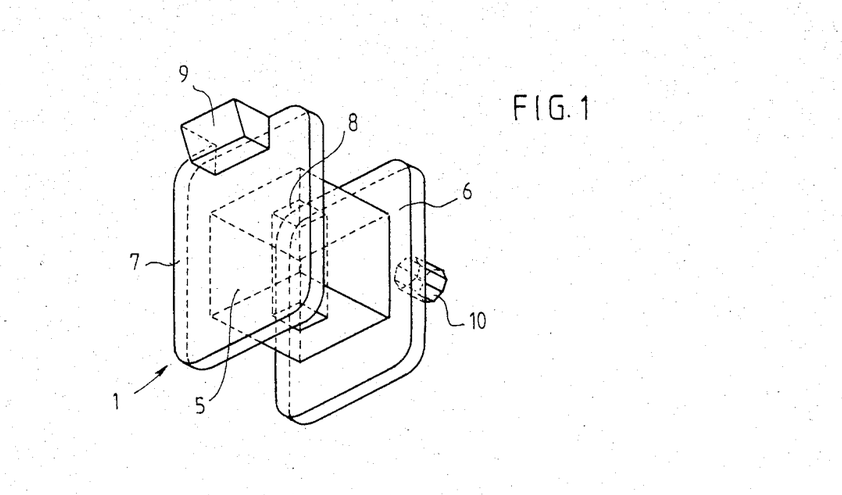

Once the modelling has been carried out, the operator may then visualize the three dimensional model of piece 1, as shown in FIG. 1. Depending on the shapes of this piece, he must then position the piece in space with respect to a system of reference coordinates X, Y, Z=φ called reference frame φ of the system, in which the plane X φ Y simulates, at least temporarily, the main joint plane of the two mold parts.

The next step comprises a fresh modelling, in three dimensions, from the first one while taking into account the shrinkage of the material during molding.

This operation may be achieved using a program specifically designed and established from the results of rheological studies and from the position of the injection point or points.

Figure 2:
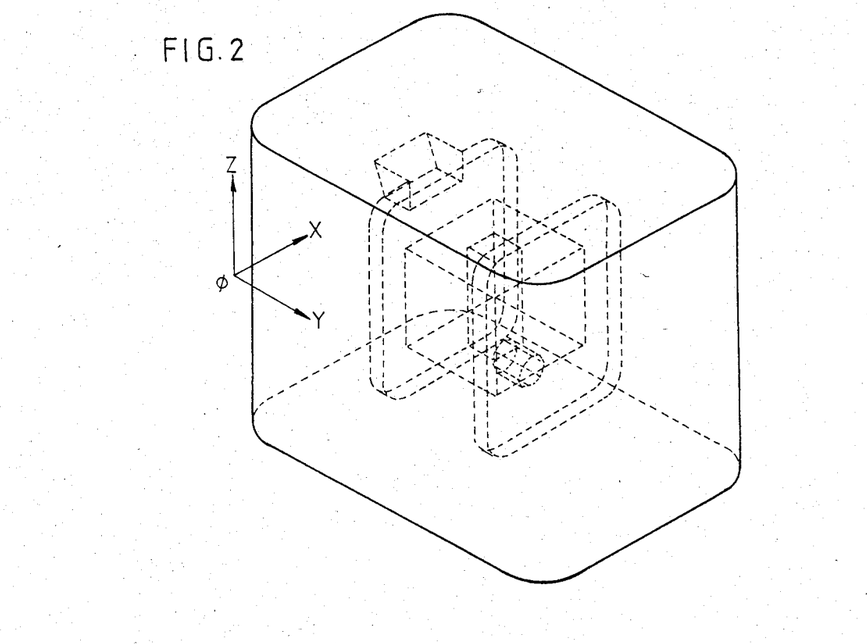
Figure 3:
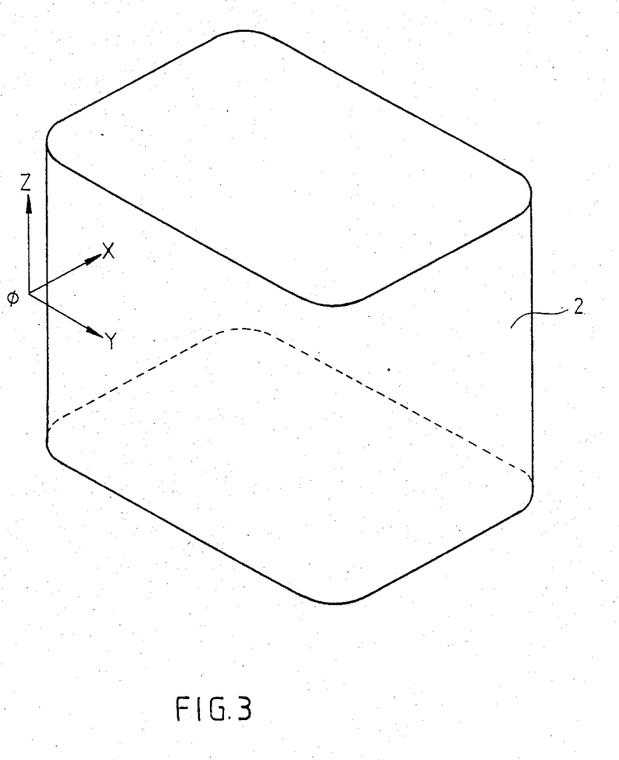

Then the model of the piece 1 is cubed, that is to say that it is integrated in a mold block or box 2, possibly parallelepipedic as shown in FIG. 2 then the negative of piece 1 is modelled by removal from box 2 of the volume of the piece (FIG. 3). This operation may be entirely carried out by the computer.

Of course, each of these steps may be visualized on a cathode ray screen or else on a plotting table.

The next step in the process consists in searching for the unstrippable zones with respect to the main joint plane. This search must be carried out successively on the fixed part and on the mobile part of the mold and may also be effected by the computer.

Figure 4A:
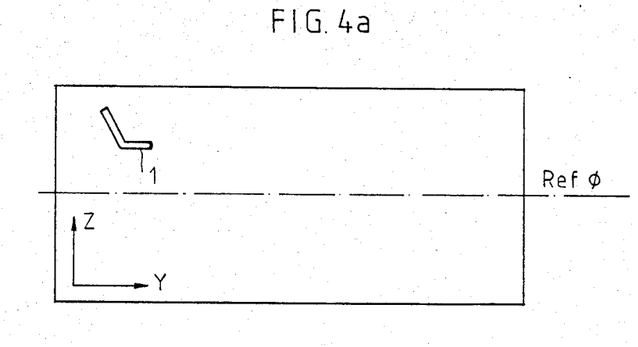
Figure 4B:
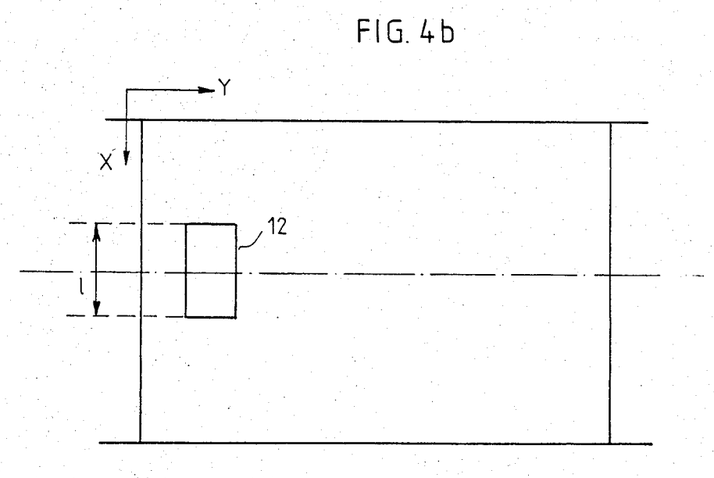

So as to obtain the unstrippable zones of the fixed part of the mold which will be assumed at the upper part, box 2 is first of all cut through the main joint plane and only the upper half box is kept which comprises the upper negative half and the computer simulates a predetermined translation of the piece (model) downwardly. It then determines the intersection zones between the upper negative half and the translated piece and visualizes the unstrippable zones thus determined in space (FIGS. 4a and 4b). The simulated movement could also, in some cases, be constitued by an affinity.

A similar procedure is followed for obtaining the unstrippable zones in the mobile part of the mold, assumed at the lower part of box 2 by simulating a predetermined translation of piece 1 upwardly and by only keeping the lower half box. The unstrippable zones which then correspond to the intersection zones between the lower negative half and the piece may be visualized in space.

It should be noted, in the example illustrated in FIGS. 1 to 10, that the piece to be molded consists of a spool carcase comprising a central parallepipedic body 5 whose two opposite lateral faces are provided with two rectangular flanges 6, 7 parallel to the reference plane Z φ X. The central body 5 comprises a central transverse recess 8 parallel to the axis φ Z. Flange 7 is provided at its periphery with a trapezoidal protuberance 9 which extends outwardly of the spool along axis φ Y, whereas flange 6 comprises a cylindrical stud 10 which also extends outwardly of the spool along axis φ Y.

In this case, the reference joint plane φ (ref φ) chosen is a plane X φ Y passing through the axis of stud 10, so that the unstrippable zone 12 visualized in a front view (FIG. 4a) and in a top view (FIG. 4b) in the fixed part corresponds to protuberance 9.

Once the unstrippable zone 12 has been located, the mold pattern designer must determine the offset joint planes so as to then define the shapes of the fixed and mobile parts of case 2 capable of ensuring correct stripping of the piece. This is a particularly delicate operation which requires all the know how of the operator.

Figure 7:
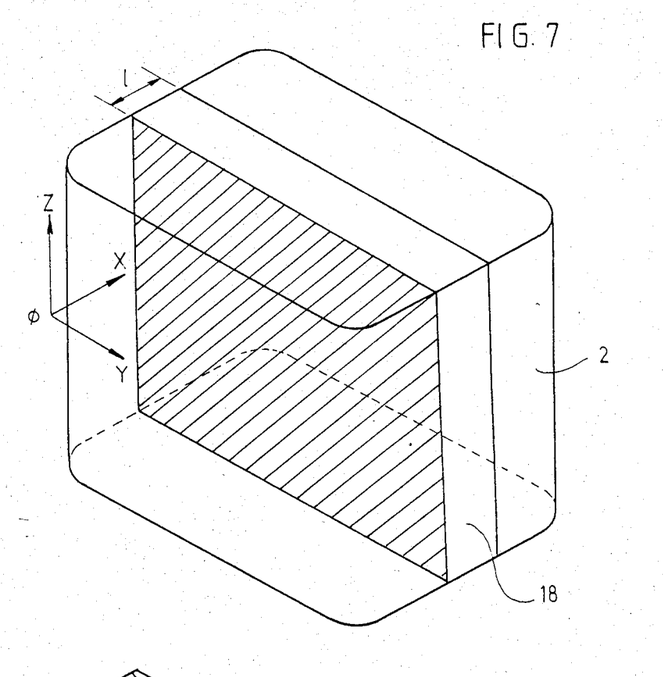
Figure 8:
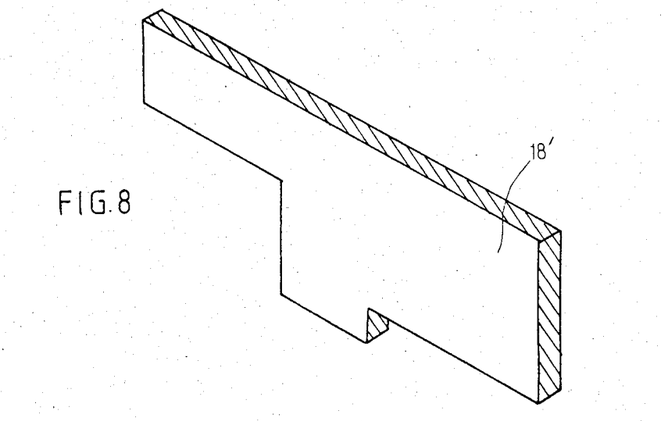

Generally, this determination is obtained by the following sequence of operations:

systematic visualization of the sections so (in two dimensions) of the models of the mobile and fixed impressions passing through the unstrippable zones (FIG. 5), the choice of these sections being determined by the mold pattern designer, determination on said sections of the future offset joint planes (by point recovery on the screen), (FIG. 6), this operation also being carried out by the designer, the creation of a volume to these standard dimensions of the models of the combined fixed and mobile impressions (or readjustment of the previously defined case 2), cutting out (by the designer), for each of the unstrippable zones, of a slice of the model of the case to the width of this zone (FIG. 7), obtaining, for each of these case slices the model of the fixed part of this slice defined by the previously determined joint planes (FIG. 8);

merging of the fixed parts of said slices so as to obtain a model of the fixed part of the case without impression (FIG. 9), formation of the impression in the model of the fixed part of the case by positioning the model of the piece in the reference frame φ and by then removing the model from the piece, the formation of the mobile part of the case without impression by removing from the model of the complete case the fixed part such as defined previously, formation of the impression in the model of the mobile part of the case by removing the model of the piece from said mobile part, in a similar way as previously indicated for the model of the fixed part.

Figure 5:
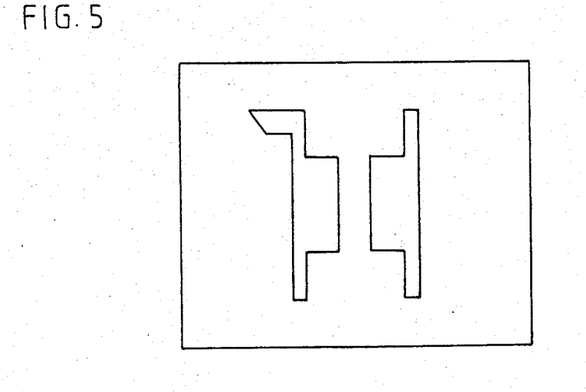
Figure 6:
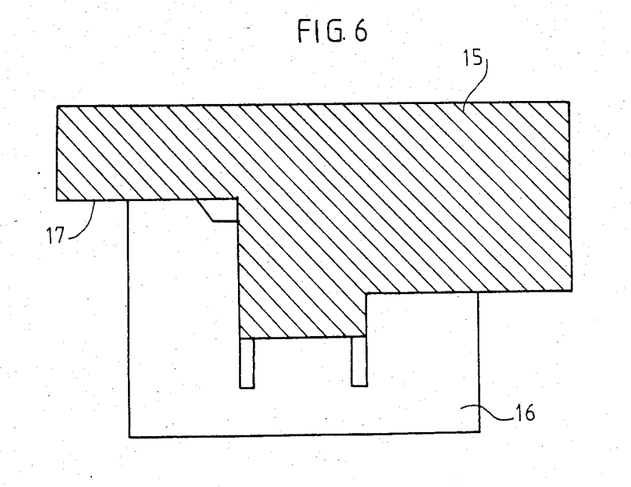
Figure 9:
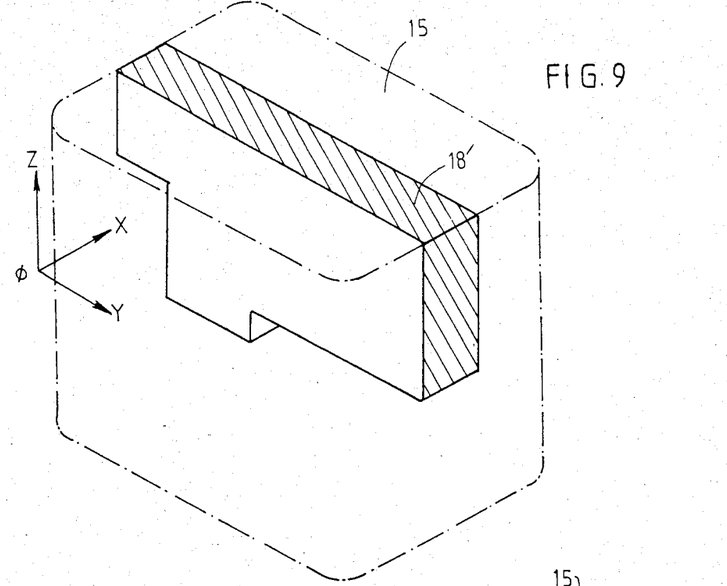
Figure 10:
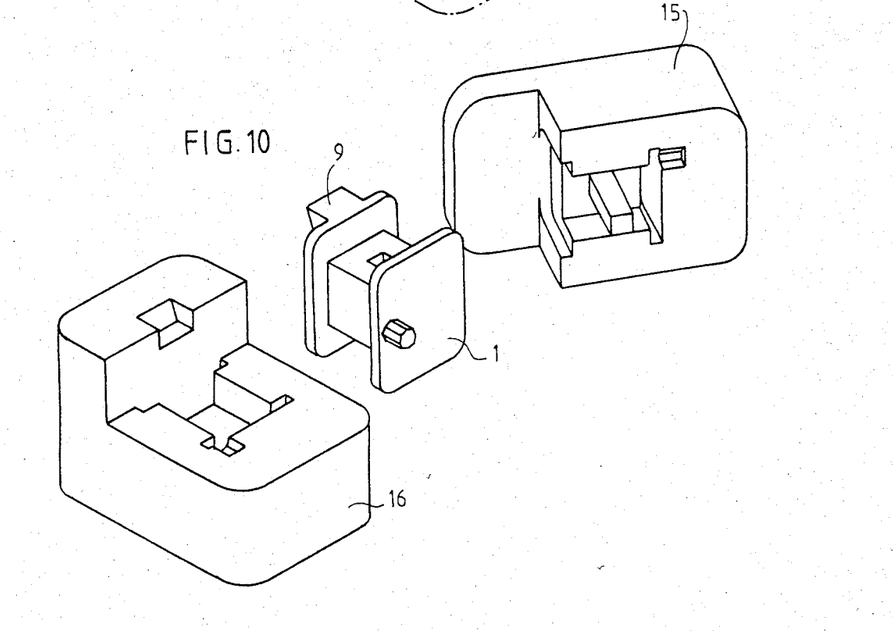

It should be noted that in the example shown in the drawings FIG. 5 is a section through A/A of FIG. 4, this section passing through the unstrippable zone 12. FIG. 6 is a view similar to FIG. 5 but in which the cutting planes between the fixed part 15 and the mobile part 16 of the mold can be distinguished. These cutting planes comprise more especially a plane 17 passing over the upper face of protuberance 9 so that it becomes possible to remove this latter from the mold during ejection of piece 1 from the mobile part 16. FIG. 7 shows the case 2 in which a section 18 including the unstrippable zone 12 has been formed. FIG. 8 is a perspective view of the fixed part 18' of the section 18 of FIG. 7. FIG. 9 illustrates the embodiment for modelling the fixed part 15 of case 2 by juxtaposition of the slices such as that shown in FIG. 8 and by merging the junction planes. FIG. 10 is a visualization, in an exploded perspective, of the two fixed and mobile parts 15, 16 of the model of case 2 and of the model of piece 1.

Once he has obtained the model of the fixed and mobile parts of the case, the mold pattern designer may then go on to studying and forming the tapers as a function of the joint planes of the two parts of the case, by systematically locating the faces of the model of the piece which are to have tapers, the formation of these tapers on the impressions then being effected by means of software specifically designed for this purpose. He may then procede to designing and the final modelling of the impressions by removal of the piece represented with actual dimensions.

The last step of the process consists in manufacturing a mold in accordance with the model previously established and stored by the computer. This manufacture may be effected conventionally according to the diagrams visualized by the computer in two or three dimensions, or even automatically using a digital control machine tool driven by a processor using a computer assisted manufacturing software compatible with the assisted design software previously used.

What is claimed is:

1. A process for manufacturing a mold from the shapes of a piece which it is desired to obtain by molding, by computer modelling of the fixed and mobile parts of a mold using a computer assisted design software for visualizing the piece in two and three dimensions, comprising at least the following steps:

modelling and graphic representation of the piece in three dimensions, determination, from the shapes of the piece and/or of its model, of a zero joint plane which forms the main separation plane of the two parts of the mold, modelling and possible graphic representation of the negative of the piece, in three dimensions, within a cubic volume which may have the dimensions of the block of material from which the mold is formed, insertion of the model of the piece in the model of its negative, search for the unstrippable zones by simulating a relative movement between the model of the piece and the two parts of the model of its negative defined by the reference plane, along an axis perpendicular to said plane, and by determining the contact surfaces between the piece and said parts of the model of the negative, visualization of the contact surfaces by a graphic representation in at least one given plane, the systematic graphic representation, in planes perpendicular to the reference plane, of the sections of the model of the negative passing through the unstrippable zones and determination of the offset joint planes in successive slices of the model of the negative including said zones and of width equal to those of said zones, modelling of the mobile and fixed parts of the mold as a function of the established joint planes, manufacture of a mold whose fixed and mobile parts comprise joint planes and impressions according to the previously established models.

2. The process as claimed in claim 1, wherein determination of the offset joint planes and modelling of the fixed and mobile parts of the mold comprise the following operations:

systematic visualization of the sections, in two dimensions, of the model of the mobile and fixed impressions combined in the unstrippable zones, determination on said sections of the future offset joint planes by the mold pattern designer, modelling of a case to the standard dimensions of the models of the combined fixed and mobile impressions, cutting out, for at least each of the unstrippable zones, of a slice of the model of the case to the width of this zone, obtaining, for each of these case slices, the model of the fixed part of this slice defined by the previously determined joint planes, merging of the fixed parts of said slices so as to obtain a model of the fixed part of the case without impression, formation of the impression in the model of the fixed part of the case, formation of the model of the mobile part of the case without impression by removing from the model of the complete case the previously determined fixed part, the formation of the impression in the model of the mobile part of the case.

3. The process as claimed in claim 2, wherein the formation of the impressions in the respective models of the fixed and mobile parts of the case is obtained by positioning the model of the piece in said parts, then by removal from said model of the piece.

4. The process as claimed in claim 2, further comprising, after formation of the impressions in the model of the fixed and mobile parts of the case, the following operations:

modelling of the piece volume from the fixed impression, modelling of the piece volume from the mobile impression, formation of the tapers on said volumes from the joint planes, merging of the two tapered piece volumes so as to allow the complete study with a piece to the actual dimensions.

* * * * *